May 5, 1942.   W. M. NICHOLS ET AL   2,282,085
PISTON
Filed Aug. 13, 1941
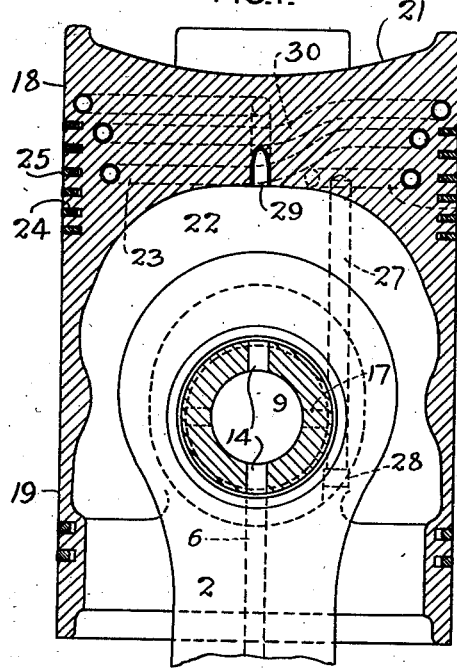
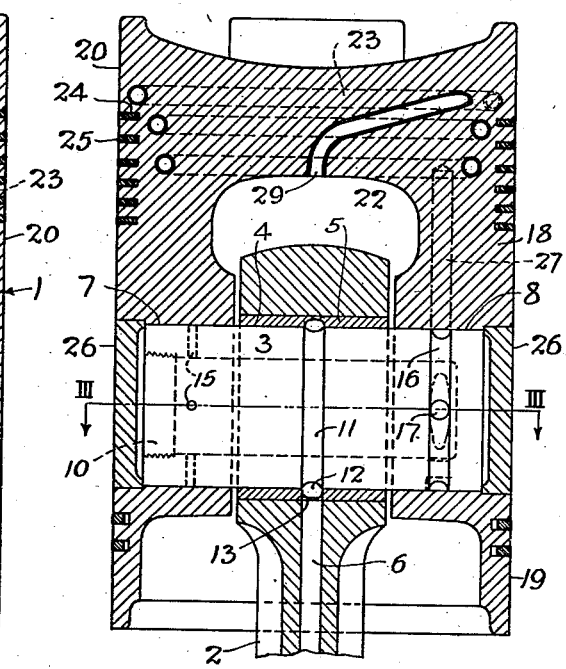
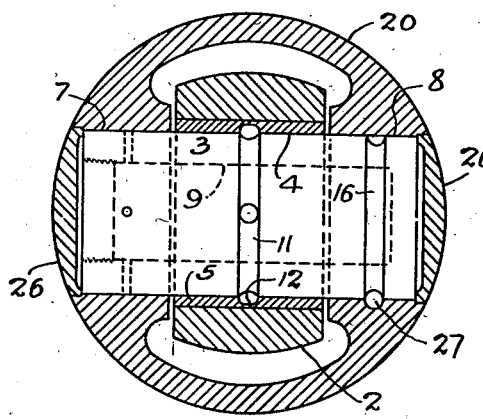
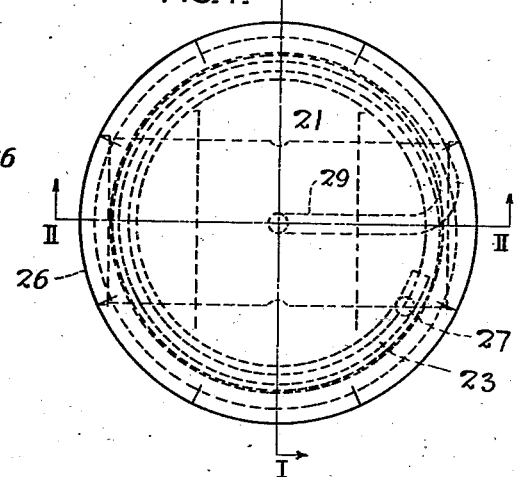
William M. Nichols
George K. Aue
John W. Anderson
INVENTORS
By S. C. Yeaton
ATTORNEY Patented May 5, 1942

2,282,085

UNITED STATES PATENT OFFICE 2,282,085

PISTON

William M. Nichols, John W. Anderson, and George K. Aue, Auburn, N. Y., assignors to American Locomotive Company, New York, N. Y., a corporation of New York Application August 13, 1941, Serial No. 406,610

1 Claim. (Cl. 123—176)

This invention relates to pistons and more particularly to a piston head having a spiral passageway therein, provided with an inlet and an outlet, for flow therethrough of a cooling fluid medium under pressure.

An object of the present invention is to provide a piston of the aforesaid characteristics in which the head is provided with piston rings and the spiral passageway winds about the axis of the head with its convolution furthest therefrom disposed in the space between the face of the outer end of the head and the outermost piston ring.

A further object is to provide a passageway in the piston head for the purpose aforesaid in the form of an inverted volute with one or more of the convolutions interiorly of one or more of the piston rings to provide an insulating heat shield therefor.

A further object is to provide pistons of the characteristics aforesaid, wherein the passageway is formed by metal tubing about which the head is cast, the tubing being of stainless steel and of a relative size and of a shape to insure fluid cooling medium supplied under pressure to flow through the passageway under a suitable pressure and at a high velocity.

Other and further objects of this invention will appear from the following description, the accompanying drawing and the appended claim.

Referring to the drawing forming a part of this application, Figure 1 is a vertical central section through a piston-connecting rod structure, taken on the line I—I of Fig. 4, the connecting rod being shown fragmentally in full; Fig. 2 is a sectional view of the structure shown in Fig. 1, taken on the line II—II of Fig. 4, the wrist pin being shown in full; Fig. 3 is a section on the line III—III of Fig. 2, the wrist pin being shown in full; and Fig. 4 is a plan view of the structure, the connecting rod being omitted.

Referring to the drawing, the piston is indicated generally by the reference numeral 1, and it is secured to a connecting rod 2 by a wrist pin 3. For the purpose of illustration, the piston is shown of a type suitable for use in an internal combustion engine, and it will be so described. However, it is to be understood that the present invention has application to other types of pistons.

The connecting rod 2 is of a well-known type, having a wrist pin orifice 4 and a fixed bushing 5 at one end and a central bore or passageway 6 extending from the bushing to its other end (not shown) which will be connected to a crankshaft of the engine, disposed in the crank case, all in the usual manner. Passageway 6 is for conducting a fluid through the connecting rod. In the present embodiment, the fluid is crank case oil which will be forced under pressure upward through the passageway 6 for a purpose presently to appear.

The piston and connecting rod are shown vertically disposed in the drawing, with the piston on the upper end of the connecting rod, and the following description will be limited to such a disposed piston and connecting rod. However, it is to be understood that the piston may be otherwise disposed if desired.

The wrist pin 3 is supported in the bushing 5, and extends beyond each end thereof into bearings 7 and 8 formed in the piston. The wrist pin is hollow interiorly, providing a chamber 9. The chamber is closed at both ends, and this may be accomplished in any desired manner. In the present instance, the chamber is shown formed by boring out the center of the wrist pin from one end almost to the other end, and closing the mouth of the bore by a plug 10, which may be threaded into the bore.

A circumferential groove 11 is formed in the outer face of the wrist pin midway between its ends, in line with a similar opposed groove 12 formed in the inner face of the bushing. An orifice 13 formed in the bushing connects grooves 11 and 12 with the passageway 6, and orifices 14 formed in the pin connect the grooves 11 and 12 with the chamber 9. Crank case oil is therefore forced under pressure from the passageway 6 to the chamber 9. At the end of the wrist pin adjacent the plug 10 are lubricating orifices 15 connecting the chamber 9 with the bearing 7 for lubrication of same and at the other end of the wrist pin, on its outer face, is formed a circumferential groove 16 connected to the chamber 9 by orifices 17 for lubrication of the bearing 8.

Piston 1 includes a head 18 and a skirt 19. There is no definite line determining where the head ends and the skirt begins, but for the purpose of the following description it will be assumed that the skirt begins below the wrist pin. The head 18 has an outer cylindrical side face 20, an end or top impulse-receiving face 21, a central interior chamber 22, a spiral or winding passageway 23 disposed internally in the head, and piston ring grooves 24 formed in the side face, in which are disposed a group of piston rings 25. Plugs 26 are disposed at the outer ends of bearings 7 and 8 covering the adjacent ends of the wrist pin and are cylindrically faced, the cylindrical face of the piston thereby being continuous.

The winding passageway 23 is of substantially inverted volute shape. The volute shape has been found to be advantageous in a piston of the type shown, as it provides passageway portions which may be disposed as shown in the space between the outermost piston ring and the face 21, and other portions inside of and adjacent the rings, thereby providing a protective heat shield or dam around the piston rings, as will presently appear. Thus the passageway, being volute, extends both longitudinally and crosswise of the piston head, the largest convolution of the volute being adjacent the top face 21 of the piston, and the remaining convolutions decreasing in diameter from the top face 21.

In the present instance, the passageway 23 is shown formed by casting the piston around a coiled tube of metal, so that the tube is embedded in the piston head, which metal is preferably of a kind such that no separation will occur between the metal of the piston and of the coil during expansion of the piston. For instance, if the piston 1 is cast of aluminum, the coil may be of stainless steel, so that the coil will have substantially the same coefficient of expansion as the aluminum casting, thus avoiding any tendency to break the bond between the coil and the casting. Stainless steel has the further advantage that it resists corrosion and any tendency of the coil, when used with certain cooling mediums, such for instance as crank case oil, to coke or retain as a deposit carbon particles in the oil. However, it is contemplated that the passageway 23 may be made by other methods.

The passageway 23 has been described as of "volute" shape, which term seems best descriptive of the general shape of the passageway. However, the passageway need not be a true volute, and in fact, is not shown as a true volute, and in the following description and claim, the term "volute" will be employed to mean any shape generally curling or winding about an axis, crosswise and axially of the piston head.

Passageway 23 is provided with an inlet and an outlet, the inlet being formed by an inlet passageway 27 bored vertically upward through the radially outer portion of the piston head. Passageway 27 is closed at its lower end by a plug 28, intercepts bearing 8 adjacent wrist pin groove 16 for communication with groove 16, and connects with passageway 23 near the free end of its innermost convolution, which free end may be closed in any desired manner before the piston is cast around the tubing.

The outlet is formed by an outlet passageway 29, which is a continuation of the free end of the outermost convolution, and extends substantially radially and downwardly through the upper portion of the head and opens into the chamber 22 at the axis of the piston.

Passageway 23 is for the passage therethrough of a piston head fluid cooling medium. In the present instance the medium, as aforesaid, is crank case oil, forced under pressure through passageway 6 and wrist pin 3 into the inlet passageway 27 from which it flows through passageway 23 to outlet passageway 29, discharging therefrom into chamber 22 onto the top of the connecting rod and back into the crank case. In its passage through the passageways of the piston head, the oil receives heat from the piston head due to combustion, thereby cooling the piston head and preventing transmission of the heat to the piston rings. When the oil drops on the connecting rod, it is splashed, due to the movement of the piston and connecting rod, onto the inner walls of the piston, further giving a general cooling of the piston.

While the piston head cooling medium has been described in the present instance, as crank case oil, which is the most available fluid in an internal combustion engine, it will be understood that other fluids may be employed if desired. The means of forcing the oil upward through passageway 6 and therefrom through the wrist pin and piston head has not been shown, as there are several well-known mechanisms suitable for accomplishing this, which may be employed, if desired, in the present instance. The means for forcing the medium to the piston head under pressure forms no part of the present invention and will be in the present embodiment the pump usually employed for pumping the fluid through the connecting rod.

The tubing chosen for the coil will preferably be of such relative size and shape as to produce a high velocity flow of the pressure medium through the piston, thus giving efficient heat conduction and also minimizing possibilities of coke formation and accumulation of deposits inside of the coil, which may be further improved by employing stainless steel tubing as aforesaid. The volute is shown formed of substantially flat convolutions connected together by oblique passageway portions 30. This provides substantially complete horizontal rings that may be arranged relative to the piston rings to best provide a heat shield or dam, shutting out excessive heat from the piston rings passing downwardly from the piston top face within the passageway rings.

The invention is useful in various types of pistons, single or double acting, and in internal combustion engine pistons of the four cycle or two cycle types. Also, where the head is cast as an integral structure or is a composite structure.

The piston is adapted for use in high power internal combustion engines, such for instance as Diesel engines employing combustion chambers arranged for multiple radial jets. In such an engine an important portion of the combustion takes place in the outer parts radially of the combustion chamber. In other words, the gases toward the outer parts of the combustion chamber are at high temperatures during combustion. Furthermore, as will be seen from Fig. 4, substantially one-half of the piston area is confined to the outer one-quarter of the distance measured from the center of the piston to the piston side face. Consequently fully one-half of the heat absorbed by the piston head is absorbed around the outer part of the area of the top face of the piston, and this heat absorbed by the piston travels directly downward to the piston rings.

It is highly desirable to place the cooling medium passageway, or a convolution thereof, above the piston rings, as aforedescribed, so that the outermost convolution, for example, is above and adjacent the top ring, as is shown in both Figs. 1 and 2. The second convolution is radially opposite the two top rings, and the third convolution is radially opposite the middle piston ring. Obviously other convolutions may be added. Thus any heat travelling vertically downward from the top face, or travelling diagonally outward, is checked by the heat shield or dam created by the volute.

A cooler piston and piston rings having been obtained, many advantages flow therefrom. For instance, the piston of the present invention has been found to run so much cooler than conventional pistons that smaller clearances in the cylinder can be obtained. Furthermore, the rings are found to be perfectly free in their grooves after continued service. It follows that by cooling the piston better combustion conditions will also be present in the combustion chamber, improving the general operation of the engine and indirectly lowering the cost of maintenance of the engine.

While there has been hereinbefore described an approved embodiment of this invention, it will be understood that many and various changes and modifications in form, arrangement of parts and details of construction may be made thereto without departing from the spirit of the invention and that all such changes and modifications as fall within the scope of the appended claim are contemplated as a part of this invention.

The invention claimed and desired to be secured by Letters Patent is:

A piston comprising a head having a cylindrical side wall, an impulse-receiving end wall, and piston ring grooves in said side wall arranged in axial sequence below said end wall, one below another; piston rings in said grooves; and a hollow volute cooling pasageway disposed interiorly in said head, with a portion adjacent and radially interiorly of said rings, and another portion above and in axial alignment with said rings between the top ring and said end wall.

WILLIAM M. NICHOLS.
JOHN W. ANDERSON.
GEORGE K. AUE.